United States Patent
Harris et al.

(10) Patent No.: US 8,612,137 B2
(45) Date of Patent: Dec. 17, 2013

(54) SYSTEM, METHOD AND APPARATUS FOR TRACKING PARKING BEHAVIOR OF A VEHICLE

(75) Inventors: Ryan Harris, Parkland, FL (US); Meir Schwartz, Fort Lauderdale, FL (US); Meir Hayman, Lezion (IL)

(73) Assignee: Ituran USA

( * ) Notice: Subject to any disclaimer, the term of this patent is extended or adjusted under 35 U.S.C. 154(b) by 64 days.

(21) Appl. No.: 13/185,082

(22) Filed: Jul. 18, 2011

(65) Prior Publication Data
US 2013/0024202 A1 Jan. 24, 2013

(51) Int. Cl.
*G05D 1/00* (2006.01)
*G05D 1/02* (2006.01)
*B60Q 1/48* (2006.01)
*G08G 1/14* (2006.01)

(52) U.S. Cl.
USPC ......... 701/408; 701/300; 340/932.2; 340/933

(58) Field of Classification Search
USPC ........ 701/408, 300; 340/933, 932.2; 235/384; 705/13
See application file for complete search history.

(56) References Cited

U.S. PATENT DOCUMENTS

| | | | |
|---|---|---|---|
| 5,004,997 A * | 4/1991 | Shisgal et al. | 340/436 |
| 5,504,314 A * | 4/1996 | Farmont | 235/384 |
| 6,025,774 A | 2/2000 | Forbes | |
| 6,249,217 B1 * | 6/2001 | Forbes | 340/426.19 |
| 6,356,841 B1 | 3/2002 | Hamrick et al. | |
| 6,650,250 B2 * | 11/2003 | Muraki | 340/932.2 |
| 6,885,312 B1 * | 4/2005 | Kirkpatrick | 340/932.2 |
| 7,102,510 B2 | 9/2006 | Boling et al. | |
| 7,119,696 B2 * | 10/2006 | Borugian | 340/576 |
| 7,133,685 B2 | 11/2006 | Hose et al. | |
| 7,664,462 B2 | 2/2010 | Liu et al. | |
| 7,957,900 B2 * | 6/2011 | Chowdhary et al. | 701/300 |
| 2002/0128769 A1 * | 9/2002 | Der Ghazarian et al. | 701/207 |
| 2003/0146852 A1 * | 8/2003 | O'Dell | 340/932.2 |
| 2005/0125284 A1 * | 6/2005 | Fairbaugh | 705/13 |
| 2005/0177492 A1 | 8/2005 | Camping | |
| 2005/0235008 A1 | 10/2005 | Camping et al. | |
| 2007/0057817 A1 * | 3/2007 | Aman | 340/933 |
| 2007/0150192 A1 | 6/2007 | Wakamatsu et al. | |
| 2007/0185728 A1 | 8/2007 | Schwarz et al. | |
| 2007/0194881 A1 | 8/2007 | Schwarz et al. | |
| 2008/0048885 A1 * | 2/2008 | Quinn | 340/932.2 |
| 2009/0204325 A1 * | 8/2009 | Chowdhary et al. | 701/300 |

* cited by examiner

*Primary Examiner* — Thomas Black
*Assistant Examiner* — Tyler Paige
(74) *Attorney, Agent, or Firm* — The Belles Group, P.C.

(57) ABSTRACT

A system, method and apparatus for tracking the parking behavior of a vehicle. In one embodiment, the apparatus may comprise a circuit located within the vehicle, the circuit comprising a processor, movement detection means, location identification means, a memory, a transceiver, and a timer operably coupled together; wherein for each occurrence in which the movement detection means detects that the vehicle has entered into the parked state, the circuit is configured to: (1) measure at duration that the vehicle remains in the parked state; (2) identify the geographic location of the vehicle; (3) detect whether the vehicle transitions into the non-parked state from the parked state; (4) upon the duration exceeding a predetermined minimum time threshold, storing parking information data relating to the occurrence in the memory as a parking instance; and (5) upon the duration failing to exceed the predetermined minimum time threshold, discarding the parking information data.

17 Claims, 7 Drawing Sheets

SYSTEM, METHOD AND APPARATUS FOR TRACKING PARKING BEHAVIOR OF A VEHICLE

FIELD OF THE INVENTION

The present invention relates generally to a system, method and apparatus for tracking the parking behavior of as vehicle, and more specifically to a system, method and apparatus for using historical vehicle parking behavior to predict a future location of the vehicle.

BACKGROUND OF THE INVENTION

The purchase of personal property, and specifically vehicles such as automobiles, motorcycles and boats, is generally accomplished by the consumer financing the purchase through a personal loan system. In such a circumstance, the purchaser borrows money from a financial or lending institution, takes title to the vehicle and pays the loan balance in monthly installments, which amortize the full amount of the loan. The financial institution typically retains a lien interest against the title of the vehicle and the loan is secured by a chattel mortgage thereon. Thus, the vehicle is used as collateral for the loan. The financial institution may confiscate or repossess the vehicle upon a default condition of the loan, as agreed to by the purchaser or as provided at law. However, due to the mobile nature of a vehicle, it is often difficult for the financial institution to locate a vehicle for repossession. To make it even more difficult, when a purchaser of a vehicle knows he is in default of the loan, the purchaser will attempt to evade repossession of the vehicle by storing the vehicle in locations that are unbeknownst to the financial institution.

When a purchaser who is in default evades repossession of the vehicle, the repossession process can become quite costly for the financial or lending institution. Specifically, the financial or lending institution will have to hire a third party repossession agent and/or an investigative service agency to assist in locating and recovering the vehicle.

Devices have been designed and deployed to assist financial or lending institutions with the repossession of personal property such as vehicles. Most of these devices are electronic devices that are affixed to the vehicle to act as a homing beacon or GPS module. Thus, whenever vehicle repossession is deemed necessary, the homing device can be activated or the GPS module used to determine a present location of the collateral. However, this methodology is expensive and completely ineffective if for instance, the purchaser of the vehicle removes or disables the device.

Furthermore, when a purchaser of a vehicle knows at the time of purchase that he will likely be unable to make the monthly payments, the purchaser may make the purchase fraudulently. Specifically, the purchaser may provide the financial or lending institution with an incorrect personal address in order to further evade repossession of the vehicle upon default.

Thus, a need exists for a system, method and/or apparatus to assist the financial or lending institution in locating a vehicle for repossession after the vehicle owner defaults on the loan payments. Furthermore, a need also exists for a system, method and/or apparatus to assist with fraud prevention in the purchase and sale of personal property such as vehicles.

BRIEF SUMMARY OF THE INVENTION

The present invention is directed to a system, method and apparatus for tracking the parking behavior and trends of a vehicle. In one aspect, the invention can be an apparatus for tracking parking behavior of a vehicle, the apparatus comprising: a circuit located locally within the vehicle, the circuit comprising a processor, movement detection means for detecting whether the vehicle is in a parked state or a non-parked state, location identification means for identifying a geographic location of the vehicle, a memory, a transceiver, and a timer operably coupled together; wherein for each occurrence in which the movement detection means detects that the vehicle has entered into the parked state, the circuit is configured to: (1) measure a duration that the vehicle remains in the parked state; (2) identify the geographic location of the vehicle; (3) detect whether the vehicle transitions into the non-parked state from the parked state; (4) upon the duration exceeding a predetermined minimum time threshold, storing parking information data relating to the occurrence in the memory as a parking instance; and (5) upon the duration failing to exceed the predetermined minimum time threshold, discarding the parking information data.

In another aspect, the invention can be a method of tracking parking behavior of a vehicle comprising: a) detecting whether the vehicle has entered into a parked state; b) upon detecting that the vehicle has entered in the parked state, measuring a duration that the vehicle remains in the parked state; c) monitoring whether the vehicle transitions from the parked state to a non-parked state; d) comparing the duration that the vehicle is in the parked state to a predetermined minimum time threshold; and e) upon the duration exceeding the predetermined minimum time threshold, storing parking information data as a parking instance in a local memory located within the vehicle, or upon the duration tinting to exceed the predetermined minimum time threshold, discarding the parking information data.

In yet another aspect, the invention can be a method of detecting fraud by a purchaser of a vehicle comprising: a) recording the purchaser's address; b) detecting whether the vehicle has entered into a parked state; c) upon detecting that the vehicle has entered into the parked state, measuring a duration that the vehicle remains in the parked state; d) monitoring whether the vehicle transitions from the parked state to a non-parked state; e) comparing the duration that the vehicle is in the parked state to a predetermined minimum time threshold; f) upon the duration exceeding the predetermined minimum time threshold, storing parking information data including as geographic location of the vehicle as a parking instance in a local memory located within the vehicle; and g) comparing the geographic location of the vehicle with the purchaser's address.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features of the exemplified embodiments will be described with reference to the following drawings in which like elements are labeled similarly.

The present invention will become more fully understood from the detailed description and the accompanying drawings, wherein.

DETAILED DESCRIPTION OF THE INVENTION

Figure 1:
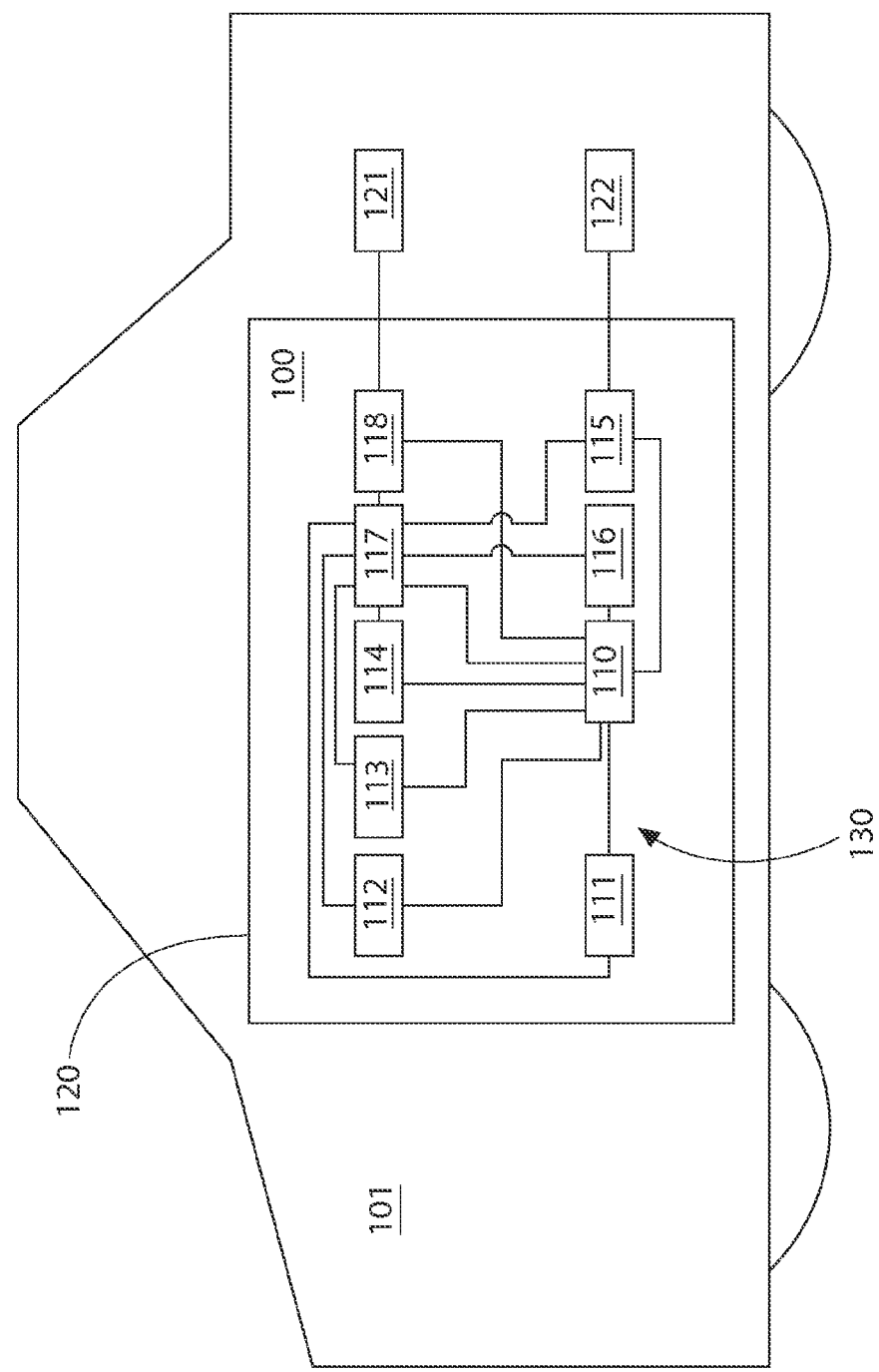
FIG. 1 is a schematic representation of an apparatus located within a vehicle for tracking parking behavior of the vehicle in accordance with an embodiment of the present invention.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Referring first to FIG. 1, a device 100 for tracking the parking behavior of a vehicle is schematically illustrated. In the exemplified embodiment, the device 100 is illustrated located and installed within a vehicle 101. Furthermore, in the exemplified embodiment the vehicle 101 is illustrated as an automobile, such as a car. However, the invention is not to be so limited and the vehicle 101 can be an automobile such as a car or truck, motorcycle, a bicycle, a boat (including house boats), an airplane, a helicopter, as house trailer, a mobile home, a recreational vehicle, heavy machinery such as a tractor and other farm equipment or the like.

The device 100 generally comprises a circuit 130 that is located locally within the vehicle 101. In some embodiments, the circuit 130 may be disposed within a housing 120 such that the device 100 is a unit that is separate and distinct from, yet can be installed within, the vehicle 101. However, in certain other embodiments the circuit 130 can be installed within the vehicle 101 without being contained within a housing. The circuit 130 comprises a processor 110, an internal memory 111, a receiver 112, a transmitter 113, a timer 114, movement detection means 115, location identification means 116, a power supply 117 and external inputs 118 all operably coupled together.

The processor 110 may be any type of properly programmed processing device, such as a computer or microprocessor. The processor 110 is configured with specific algorithms to enable the device 100 to store and organize the most common and lengthy stops (i.e., parked states) made by the vehicle 101. The processor 110 enables the device 100 to automatically store and organize information related to the stops made by the vehicle 101 and to then transmit that information to a server 140 for further processing and storage in a database 160 for end user access as will be described in detail below with reference to FIG. 2. More specifically, the circuitry 130 constructs a virtual table or log internally or locally in the device 100 that contains information related to the stops made by the vehicle 101 and organizes that information by longest duration to shortest duration. Furthermore, if the memory 111 of the device 100 is full, the device 100 will only store information related to a new stop made by the vehicle 101 if the duration of the new stop is greater than the shortest duration stop currently stored in the memory 111 of the device 100. Thus, the device 100 that is installed within the vehicle 101 (and more specifically the circuit 130 that is located locally within the vehicle 101) can internally store and organize the desired information prior to transmitting that information to the server 140 and database 160 for end user access.

Each of the memory 111, the receiver 112, the transmitter 113, the timer 114, the movement detection means 115, the location identification means 116, the power supply 117 and the external inputs 118 are operably coupled to the processor 110. Furthermore, each of the components is also operably coupled to the power supply 117 so that the device 100 is capable of operation even without operable connection to an external power source. The power supply 117 is preferably a rechargeable power source such that the power supply 117 can be recharged by a battery 121 of the vehicle 101 as needed. Furthermore, although the receiver 112 and the transmitter 113 are illustrated as separate components, the receiver 112 and the transmitter 113 can be collectively referred to as a transceiver that is capable of performing the functions of both the receiver 112 and the transmitter 113.

In the exemplified embodiment, the external inputs 118 include a power input for operable coupling to the vehicle battery 121. Of course, additional external inputs can be included in the device 100 as necessary to achieve additional functionality to the device 100 as desired.

The movement detection means 115 is a means for detecting whether the vehicle 100 is in a parked state or a non-parked state, in the exemplified embodiment, the movement detection means 115 is an ignition input that is operably coupled to an ignition switch 122 of the vehicle 101. However, the invention is not to be so limited and in certain other embodiments the movement detection means 115 can be a GPS module or a vehicle engine on/off detector, which will be described in detail below.

In the exemplified embodiment wherein the movement detection means 115 is an ignition input, the ignition input enables the device 100 to detect if the vehicle 100 is stopped or moving based on the status of the vehicle ignition switch 122. More specifically, by connecting the ignition input (i.e., movement detection means 115) of the device 100 to the ignition switch 122 of the vehicle 101, the device 100 can detect that the vehicle 101 is in a non-parked state when the ignition switch 122 is turned on and that the vehicle 101 is in a parked or stopped state when the ignition switch 122 is turned off. In embodiments where the movement detection means 115 is a vehicle engine on/off detector, the movement detection means 115 operates in a similar manner. Specifically, utilizing a vehicle engine on/off detector, the device 100 may detect whether the vehicle 101 is in as parked state or in a non-parked state by determining whether the vehicle engine is turned off or on. In this method, it is possible to detect if the vehicle 101 is in a parked or non-parked state based on the engine status; if the engine is on, the vehicle is in a non-parked state and if the engine is off, the vehicle is in a parked state. The device 100 is capable of monitoring the voltage level of the vehicle 101 electrical system at all times by virtue of the installation of the device 100 in the vehicle 101. The device 100 can sense changes in the voltage level of the vehicle electrical system to determine whether the vehicle 101 is in a moving or parked state.

Furthermore, in still other embodiments as noted above a GPS module can operate as the movement detection means 115 to detect if the vehicle 101 is in a parked or non-parked state. Specifically, the GPS module can check the vehicle's speed and location in resolutions of one second to determine whether the vehicle 101 is in a moving or parked state.

Furthermore, in certain other embodiments the movement detection means 115 can be a device that monitors the CAN-BUS line of the vehicle, which is located on the OBDII connector. In such an embodiment, the device will be connected to the CAN-high and CAN-low wires of the vehicle, and will read the data running on those wires, in one minute resolution. When the ignition switch is turned to its "on" position, data communication will run on the line. The device will detect the data communication running on the line as ignition on, which will indicate that the vehicle is in a moving state. When the ignition switch is turned to its off position, no data is running on the wires. Thus, in such a circumstance the device will detect that the ignition is off and the vehicle is in as non-moving state.

In still another embodiment, the vehicle detection means 115 may be a device that reads the odometer of the vehicle from the CAN-BUS line. In such an embodiment, the device will have the ability to read the amount of mileage accumulated during a specific trip. If no change in the odometer reading is detected for a predetermined, or specified amount of time, the device will consider the vehicle as being in a non-moving state.

As used herein, the term parked state is used to refer to any point in time that the vehicle 101 within which the device 100 is positioned and installed is motionless. This includes periods of time when the vehicle 101 engine is turned off such as being parked in a parking lot and periods of time when the vehicle 101 engine is turned on but the vehicle 101 is motionless, such as being stopped at a stop sign. However, as will be understood front the description below, the device 100 is particularly suited for tracking the parking behaviors and trends of the vehicle 101 over a period of time. This tracked parking behavior can then be stored as parking instances or historical data in the database 160 and used to predict where the vehicle 101 may be located at a future date and time. Thus, it is mainly desirable to determine when the vehicle is parked and turned on in order to determine locations that the vehicle 101 will be left for long periods of time. The ignition switch 122/ignition input connection, engine on/off monitoring and/or the GPS module are three different methods that assist with making this determination. Tracking locations where the vehicle 101 is parked for long, periods of time will assist with repossession by enabling the repossession agents to determine the most effective locations and times to repossess the vehicle 100 while avoiding potential confrontation with the vehicle 101 purchaser/owner.

Figure 2:
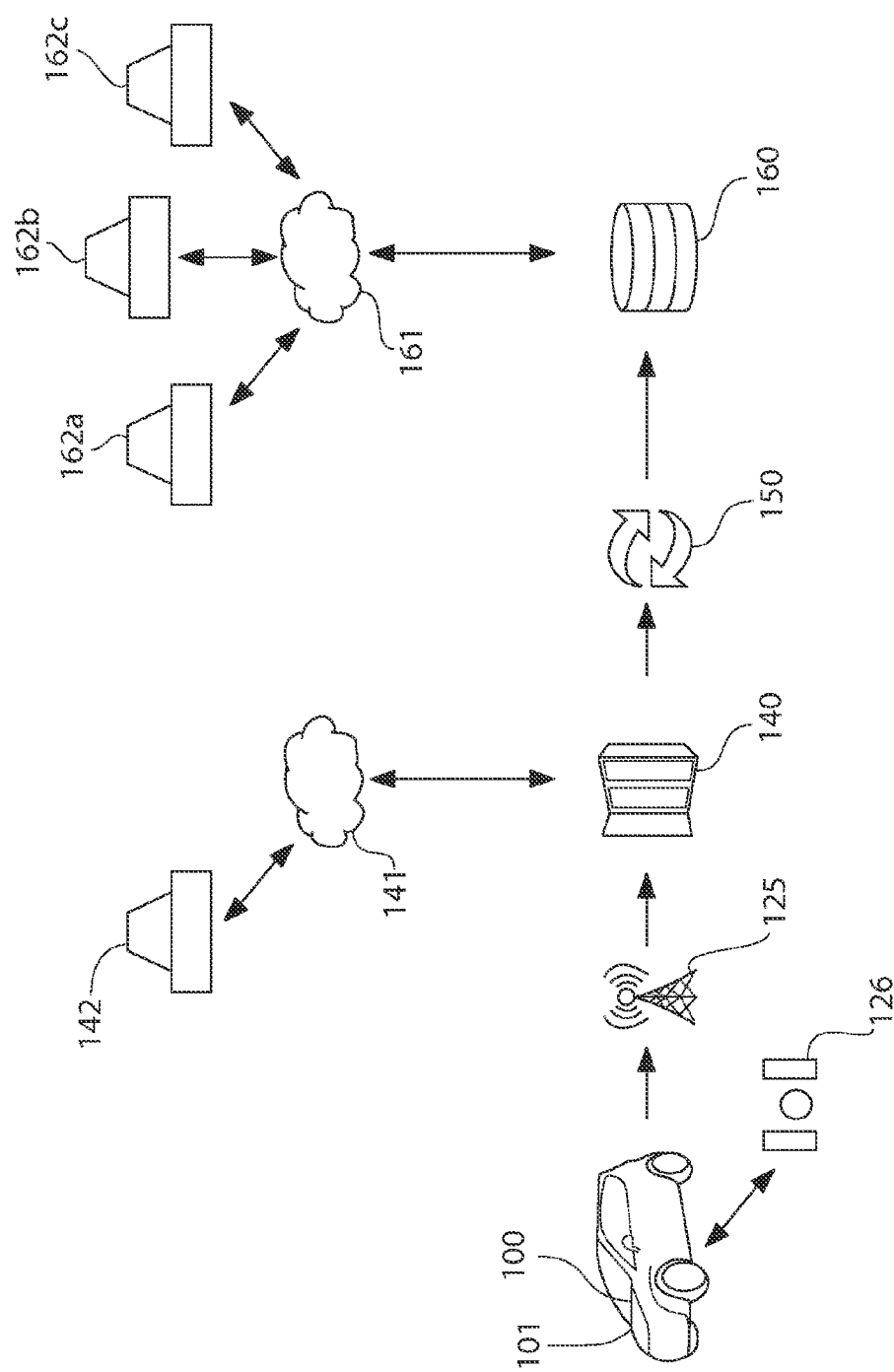
FIG. 2 is an overall block diagram of a vehicle tracking system in accordance with an embodiment of the present invention.

Referring to FIGS. 1 and 2 concurrently, the invention will be described in more detail. The circuit 130 comprises a location identification means 116 for identifying a geographic location of the vehicle 101. In the exemplified embodiment, the location identification means 116 is a GPS module. However, the invention is not to be so limited and the location identification means can be an electric beacon such as a radio, infrared or sonar beacon. In certain embodiments, both the movement detection means 115 and the location identification means 116 can be a GPS module. A GPS module can operate as the location identification means by passively receiving signals from as satellite 126. More specifically, the satellite 126 transmits data that indicates the location of the device 100 (and hence also of the vehicle 101 within which the device is installed) and the current time to the GPS module. This location and time data is then sent to the processor 110 and other circuitry 130 for further processing.

The device 100 within the vehicle 101 also transmits data to and receives data from the server 140. More specifically, the transmitter 113 transmits data to the server 140 via a wireless carrier 125 using a general packet radio service (GPRS) protocol. The GPRS protocol enables the device 100 to package a set of data, regardless of content, type or structure, and transmit it to the server 140 together as a single packet. Of course, the invention is not to be so limited and other transmission protocols can be used for the transmission of data between the server 140 and the device 100. The specific data transmitted from the transmitter 113 to the server 140 will be described in more detail below. Furthermore, the server 140 is also able to transmit data back to the receiver 112 of the device 100. The server 140 is in communication with a computer 142 or other processor via the internet 141. Thus, a user, such as an operator of the server 140, can transmit data through the server 140 and to the device 100.

Examples of the types of data that may be transmitted from the server 140 to the device 100 via the external computer 142 include certain configurable parameters that are programmed into the device 100. In the exemplified embodiment, there are three parameters that are programmed into the device 100 to enable the device 100 to operate as will be described in more detail below. Specifically, the device 100 is programmed with a predetermined minimum time threshold, a report size and a time interval. Each of these parameters can be programmed into the device 100 prior to installation of the device 100 within the vehicle 101 or after installation and activation of the device 100 by over-the-air commands from the server 140 (i.e., transmission from the server 140 to the device 100 using the GPRS protocol through a wireless carrier). In other words, at any time after installation of the device 100 in the vehicle, the predetermined minimum time threshold, report size and time intervals can be changed as desired by an end user, such as by the operator of the server 140 via the computer 142 as described above.

The predetermined minimum time threshold is the minimum amount of time that the vehicle 100 must be in a parked state before the device 100 will define that particular parked state within the device 100 as a parking instance. Once a particular parked state is defined as a parking instance, the device 100 will record and store parking information data associated with the parking instance in the memory 111 of the device 100. More specifically, if the device 100 determines that the vehicle 100 is in the parked state for an amount of time that is greater than the predetermined minimum time threshold, the device will store the parking information data which includes the geographic location of the vehicle 101, the duration that the vehicle 101 was in the parked state and the date and time that the vehicle 101 initially came or entered into the parked state in the memory 111 of the device 100.

The minimum time threshold can be set in increments of one minute. In certain embodiments, the minimum time threshold is set to be between one and four hours, and more specifically between two and three hours. However, the invention is not to be limited by the actual time that the minimum time threshold is set to and it can be any period of time as desired by the end user. As will be described in detail below, the minimum time threshold is compared to a duration that the vehicle 101 is in the parked state to determine whether the parked state should be defined within the device 100 as a parking instance and the parking information data saved within the memory 111 of the device 100.

Referring now solely to FIG. 2, transmission of the parking information data from the server 140 to the database 160 for end user access will be further described. After the parking information data is received by the server 140, the server 140 breaks down the parking information data through multiple processes and highly engineered algorithms 150. These algorithms 150 convert the parking information data into a format that can easily be read and manipulated by an end user. Thus, after the server 140 breaks down the parking information data as described above, the parking information data is then transmitted to and stored within a specialized table in the database 160 for end user access.

End users can view and manipulate the data in the database 160 via end user computers 162*a-c* via the Internet 161. The end users can be the financial or lending institutions that loaned the capital to the vehicle purchaser so that the purchaser could initially purchase the vehicle 101 or any other entity that desires to and has permission to track the parking behavior of the vehicle 101. As such, if the user defaults on the loan by failing to make timely payments, the financial or lending institution may desire to repossess the vehicle 101. The financial or lending institution can quickly determine probable locations of the vehicle 101 by viewing and manipulating the parking information data in the database 160.

The end user can access the database 160 by logging in to a secure website via the Internet 161. Upon logging in, the end user will be presented with a graphical user interface that enables them to choose a particular vehicle for which parking information data is desired to be viewed. In other words, a particular end user (i.e., financial or lending institution) may loan money to many people to enable those people to purchase a vehicle. Thus, the end user can use the database 160 to view parking information data for any of these vehicles as necessary depending, upon which vehicle purchaser/owners are in default of their loans. The graphical user interface that an end user will view upon selecting a particular vehicle will be described in more detail below with reference to FIGS. 5A-5C.

Figure 4:
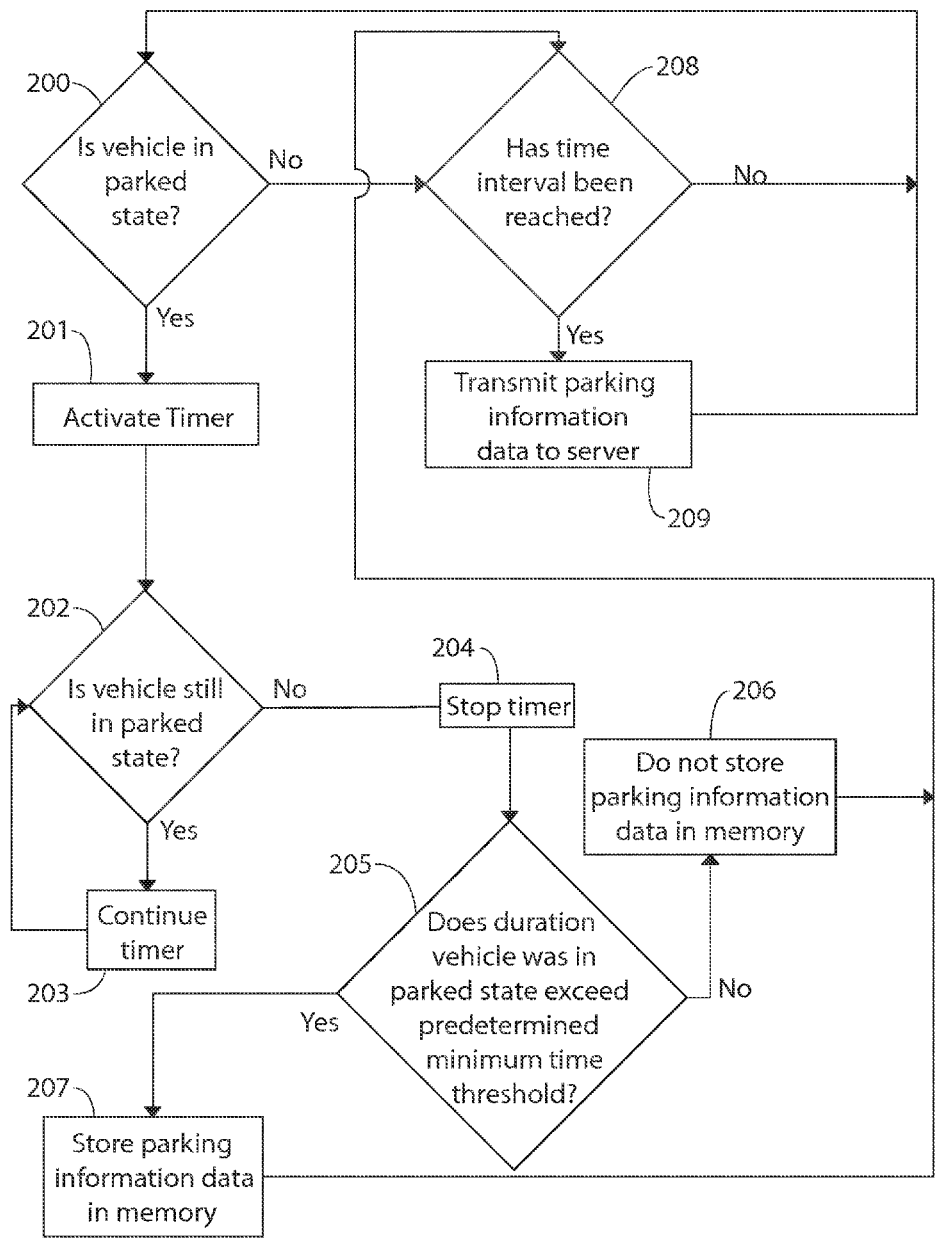
FIG. 4 is a flowchart for a method of tracking parking behavior of a vehicle in accordance with an embodiment of the present invention.

Referring to FIGS. 1 and 4, operation of the device 100 will be described in more detail in terms of a method of tracking the parking behavior of the vehicle 101. In operation, the device 100 monitors whether the vehicle 101 is in a non-parked state or a parked state (step 200) as has been described above. When the device 100 detects that the vehicle 101 is in the parked state (via the GPS module, the ignition input, monitoring the engine voltage or otherwise as described above), the timer 114 becomes automatically activated and begins counting (step 201). Thus, the timer 114 keeps track of the duration or amount of time that the vehicle 100 remains in the parked state. While the timer 114 is activated, the device 100 continually detects whether the vehicle remains in the parked state (step 202). If the device 100 determines that the vehicle 100 is still in the parked state, the timer 114 continues to count (step 203). However, as soon as the vehicle 101 transitions from the parked state to the non-parked state, the timer 114 stops (step 204). In certain embodiments, stopping the timer 114 requires that the timer 114 be deactivated and restarted. However, in certain other embodiments the timer 114 is a continually running timer. In such embodiments, activation of the timer (step 201) is simply the instance at which the timer 114 begins measuring the duration that the vehicle remains in the parked state and stopping the timer (step 204) is simply the instance at which the vehicle 101 transitions from the parked state to the non-parked state.

After the timer 114 stops in step 204, the device 100 determines whether the duration that the vehicle 101 was in the parked state exceeds the predetermined minimum time threshold (step 205). As discussed above, the predetermined minimum time threshold is a predetermined and configurable parameter that is used as a threshold for determining whether a time period that the vehicle 101 is in the parked state is sufficient to be considered as parking instance such that parking information data corresponding to the parking instance should be stored in the memory 111 of the device 100. If the device 100 determines that the vehicle 101 was not in the parked state for a duration that exceeds the predetermined minimum time threshold, then the parking information data corresponding to that particular occurrence of the vehicle 101 being in the parked state is not stored in the memory 111 (i.e., that parking information data is discarded) (step 206). Alternatively, if the device 100 determines that the vehicle 101 was in the parked state for a duration that exceeds the predetermined minimum time threshold, then the parking information data corresponding to that particular occurrence of the vehicle 101 being in the parked state is stored in the memory 111 of the device 100 as a parking instance (step 207).

In certain embodiments, prior to actually storing the parking information data into the memory 111 of the device 100 as a parking instance, the device 100 conducts a check to determine if the memory 111 is full. If the device 100 determines that the memory is full, the device 100 will purge out the parking information data corresponding to the parking instance that has the shortest parking duration in order to create space in the memory 111 for the new parking instance.

To give an example of the device 100 in operation, the predetermined minimum time threshold may be set at two hours. As soon as the vehicle 101 goes from being in a non-parked state to a parked state, the timer 114 will begin to count. If the vehicle 101 transitions back into a non-parked state prior to being in the parked state for two hours, no parking information data will be saved in the memory 111 of the device 100 and the parking information data for that particular parking occurrence will be discarded. However, if the vehicle 101 is in the parked state for two hours or more, the parking information data (i.e., the geographic location of the vehicle, the duration that the vehicle 101 was in the parked state and the date and time that the vehicle initially entered into the parked state) corresponding to that particular occurrence of the vehicle 101 being in the parked state will be stored in the memory 111 of the device 100 as a parking instance. The geographic location of the vehicle 101 can be stored in the memory 111 of the device 100 as a set of longitudinal and latitudinal coordinates and/or as a particular street address.

As soon as the duration that the vehicle 101 is in the parked state eclipses the two hour mark (or other predetermined minimum time threshold), the parking information data is stored into the memory 111 of the device 100. However, the duration will continue to increase until the vehicle 101 transitions into the non-parked state. Thus, the device 100 will continue to store into the memory 111 the current duration that the vehicle 101 has been in the parked state until the vehicle transitions from the parked state into the non-parked state so that the final duration that the vehicle 101 is in the parked state is properly stored into memory 111. The device 100 repeats this process for each occurrence that the vehicle 101 transitions into the parked state for as period of time that exceeds the predetermined minimum time threshold and saves each respective occurrence as a separate and distinctive parking instance. Thus, using each of the occurrences that the vehicle 101 is detected in the parked state for a duration exceeding the predetermined minimum time threshold, the device 100 builds a virtual table of parking information data. Furthermore, the device 100 circuitry 130 organizes the parking instances ordered by longest duration that the vehicle 101 is in the parked state to shortest duration that the vehicle 101 is in the parked state.

After the device 100 determines whether the duration that the vehicle 101 was in the parked state exceeds the predetermined minimum time threshold (step 205) and decides to either store or not store/discard the parking information data (steps 206 and 207), the device 100 will make a determination as to whether the time interval has been reached (step 208). As discussed above, the time interval is one of the three parameters that can be programmed into the device 100 either prior to or after installation of the device 100 in the vehicle 101. The time interval is the amount of time that elapses between transmissions of the parking, information data stored in the memory 111 of the device 100 to the server 140.

The time interval can be set at any increment, but is preferably set at increments of one hour. In certain embodiments, a user will desire to set the time interval to be 24 hours in order to obtain parking information data about a particular vehicle on a relatively frequent (i.e., daily) basis. A user (i.e., financial or lending institution) may desire such a short time interval if the user believes that the vehicle purchaser is likely to default on the loan. In certain other embodiments, the user may set the time interval to be 168 hours such that the parking information data about a particular vehicle will be transmitted to the server on a weekly basis. Of course, it should be understood that the time interval can be set to be less than 24 hours, between 24 and 168 hours or more than 168 hours as desired. The user must pay as tee or carrier charge each time that parking information data is transmitted from the device 100 to the server 140. Thus, maintaining a larger time interval between data transmissions will result in the user saving money.

The memory 111 of the device 110 has a storage capacity of 2000 distinct parking events. Thus, the device 110 is capable of storing a large quantity of parking information data internally so that transmissions of data to the server 140 can be made less frequently. Upon the time interval being reached, the device 100 will transmit, in a single message, the parking information data for all of the parking instances that the vehicle 101 was in the parked state for a duration that exceeded the predetermined minimum time threshold and which was not transmitted in a previous transmission.

If the device 100 determines that the time interval has not been reached at step 208, the entire process will start over with the device 100 again making a determination as to whether the vehicle 101 is in the parked state (step 200). However, if the device 100 determines that the time interval has been reached at step 208, the parking information data stored in the memory 111 of the device 100 will be transmitted to the server 140 (step 209) for further processing as discussed above. After step 209 is complete, the process will again start over with the device 100 making a determination as to whether the vehicle 101 is in the parked state (step 200).

Although the process has been described with the steps taking place in a particular order, it should be understood that the device 100 is capable of performing multiple processes at as time. Thus, the device 100 is constantly monitoring both whether the vehicle 101 is in a parked state (step 200) and whether the predetermined time interval has been reached (step 208). As such, if the predetermined time interval is reached at any time while the timer is activated or at airy other time, the parking information data will be transmitted to the server 140 at that time. In other words, at any time that the predetermined time interval is reached (step 208), the parking information data stored in the memory 111 of the device 100 will be transmitted to the server 140. One example of this is illustrated in FIG. 4 where it is shown that if the device 100 determines that the vehicle is not in the parked state, it goes immediately to step 208 to determine if the predetermined time interval has been reached. Thus, step 208 is constantly being undertaken throughout the process illustrated in FIG. 4.

Furthermore, in certain embodiments the time interval will be reached while the vehicle 101 is in the parked state and the timer is activated. In certain embodiments, if the duration that the vehicle 101 has been in a current parked state has exceeded the minimum time threshold, the parking information data for that current parked state will be transmitted to the server 140 with the current duration as of the time that the time interval was reached. Of course, in certain other embodiments any parking information data for a current parked state of the vehicle 101 will not be transmitted to the server 140 during a data transmission that occurs while the vehicle 101 is still in that current parked state. Rather, in those other embodiments the parking information data for the current parked state will be transmitted to the server 140 during a subsequent data transmission from the device 100 to the server 140. Whether or not to transmit parking information data from a current parked state of the vehicle 101 that is ongoing at the moment that the time interval is reached can be configurable and changed as desired by an end user.

Figure 3:
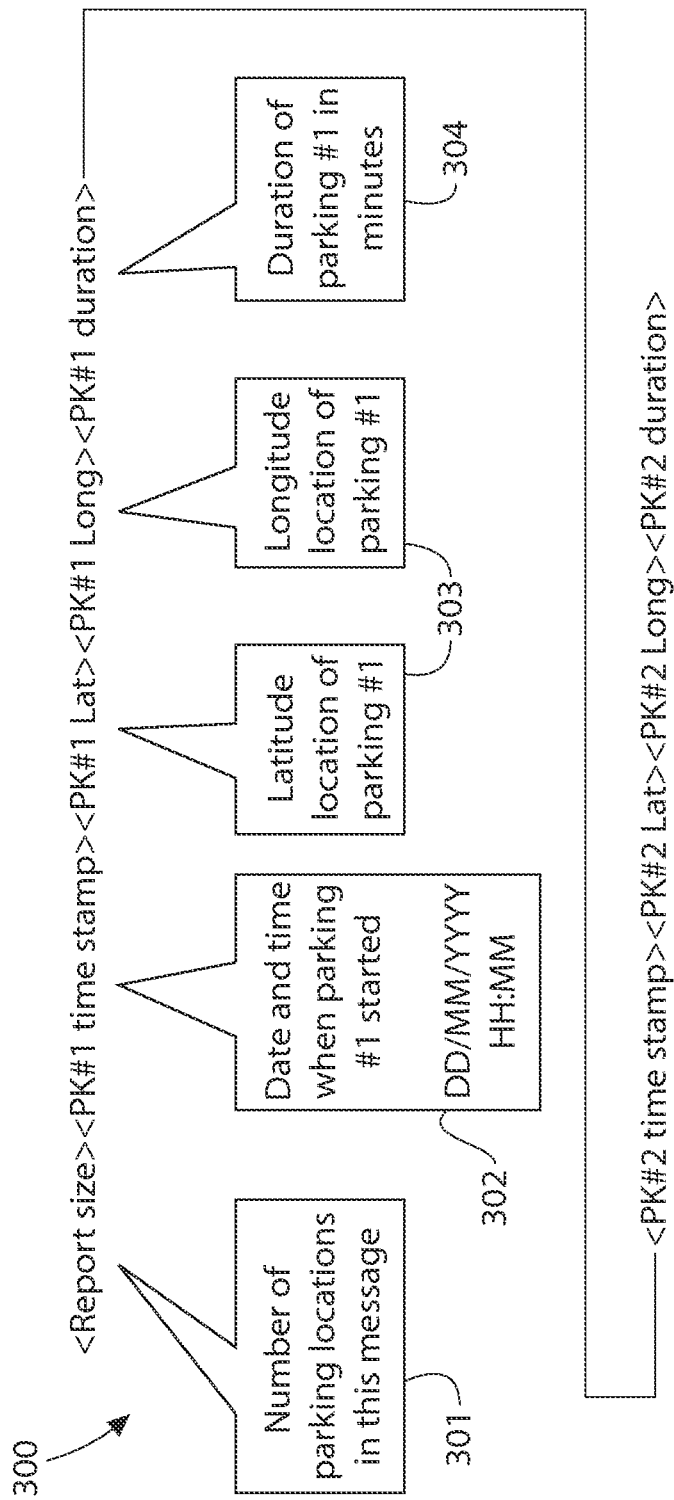
FIG. 3 is a block diagram illustrating the various components of a report in accordance with an embodiment of the present invention.

Referring to FIG. 3, a report 300 that is submitted to the server 140 when the predetermined time interval is reached (step 208) will be described in greater detail. The report 300 is a small data string that is transmitted from the device 100 to the server 140 for further processing. It is important to note that the report size is a parameter that defines the size of a message that is to be sent from the device 100 to the server 140. The report size determines the number of parking instances that will be transmitted from the memory 111 of the device 100 to the server 140 during a single transmission. If the report size is smaller than the number of parking instances that are saved in the memory 111 at the time of transmission of the parking information data from the device 100 to the server 140, the device 100 will omit the parking information data from the shortest duration stops in the report 300. In other words, the device 100 will perform a smart selection locally and then transmit to the server 140 the parking information data from the most relevant/longest duration stops/parked state occurrences. This will assist the end user in obtaining parking information data related to the longest duration stops made by the vehicle 101 within the time interval so that the end user can preferably determine the locations that the vehicle 101 is parked for the longest periods of time (typically where the vehicle owner works and lives).

Once the report size and the number of parking locations to be transmitted have been determined, the report 300 is created. The report 300 includes a report size reading 301 that indicates the number of parking locations that are included in the report 300. The report 300 also includes a time stamp 301 that indicates the date and time when the first parking occurrence that the vehicle 101 was parked for a duration longer than the predetermined minimum time threshold started. This information can be transmitted in the date format DD/MM/YYYY (date/month/year) and the time format HH:MM (hours:minutes). Of course, other formats can be used. The report 300 also includes location information 303 that indicates the latitude and longitude of the location that the vehicle was parked for the first parking occurrence. Of course, the location information 303 can also include a street address of the location that the vehicle was parked for the first parking occurrence. Finally, the report 300 includes a duration stamp 304 indicating the duration that the vehicle 101 was parked for the first parking occurrence in minutes. The report 300 then also includes the same information for the second, third, fourth and so on parking occurrences up until the number of parking occurrences/instances is equal to the report size reading 301.

As noted above, the report 300 that is transmitted sends the parking information data in order from the longest duration stops to the shortest duration stops. As such, once the report size has been met or exceeded, the longest duration stops will have been compiled into the report 300 and the shortest duration stops omitted from the report 300. In this manner, the end user is provided with the most relevant parking information data for a particular vehicle.

In some circumstances, the vehicle owner/purchaser may attempt to disable the device 100 or remove the device 100 from the vehicle 101 in order to prevent, the financial or lending institution from tracking the location of the vehicle 101. Immediately upon the device 100 being tampered with, an alert will be transmitted from the device 100 to the server 140, and then on to the database 160. Furthermore, in case the financial or lending institution does not frequently monitor the database 160, a tampering incident can result in the device 100 transmitting an alert, either directly or indirectly via the server 140, in the form of a text message, an electronic mail communication, to facsimile, a telephone call or the like to the financial or lending institution to inform them of the potential tampering incident. This will enable the financial or lending institution to become immediately aware of a potential disabling or removal of the device 100 from the vehicle 101 so that the financial or lending institution can immediately begin the repossession process or otherwise contact the vehicle owner/purchaser to determine the accuracy of the tamper alert.

The device 100 is useful even if the device 100 has been disabled or removed from the vehicle. Specifically, even if the device 100 is somehow disabled or removed from the vehicle, the historical data still exists in the database 160 and can be used to determine the best possible location to retrieve the vehicle even if new information is not being received from the vehicle. The behavior of a vehicle rarely changes that dramatically over time and having a historical record of the vehicle's parking behavior can enhance the ability to locate that vehicle at a desired time.

Figure 5A:
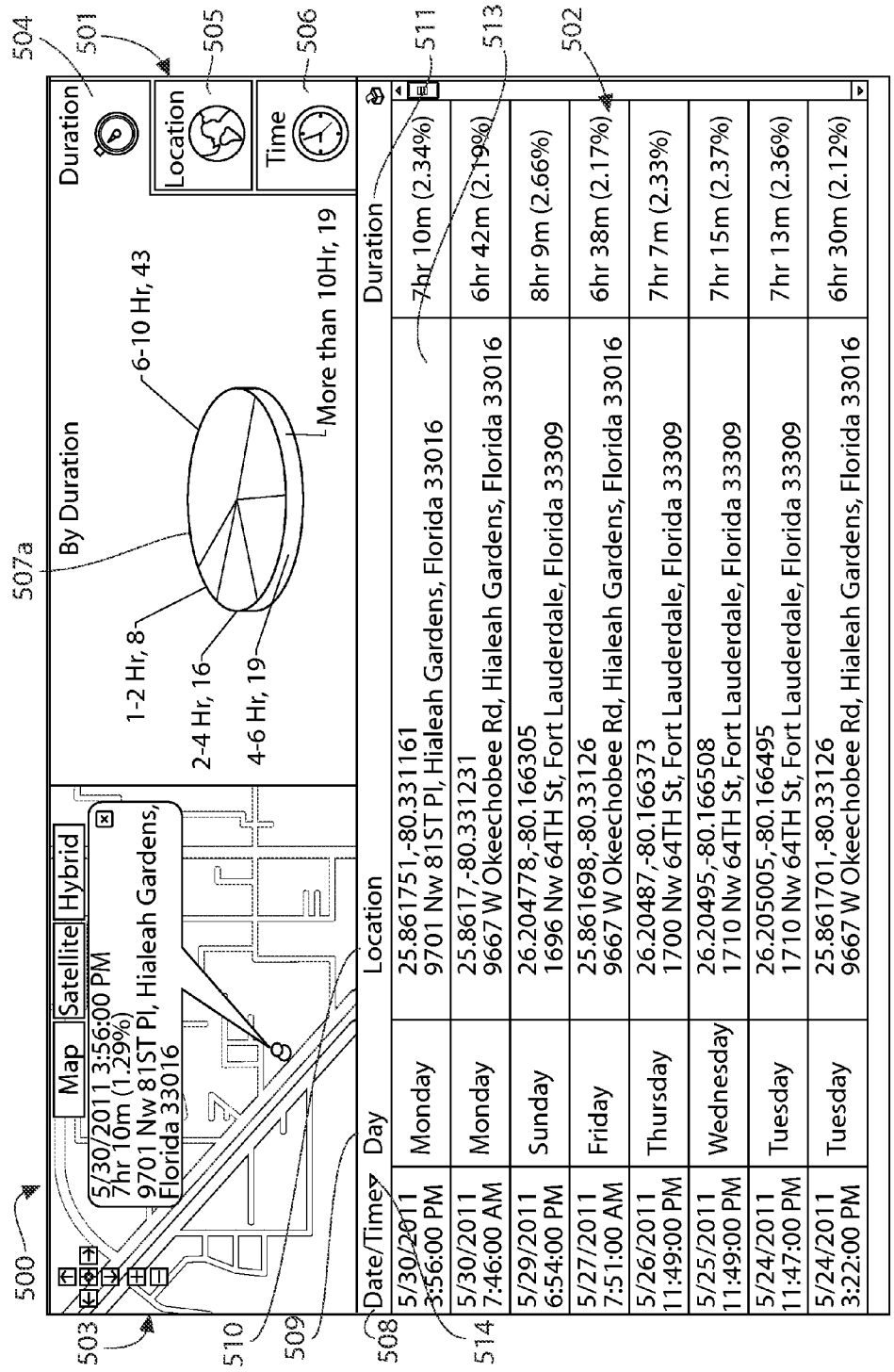
FIG. 5A is a representation of a graphical user interface organizing parking trends by duration in accordance with an embodiment of the present invention.
Figure 5B:
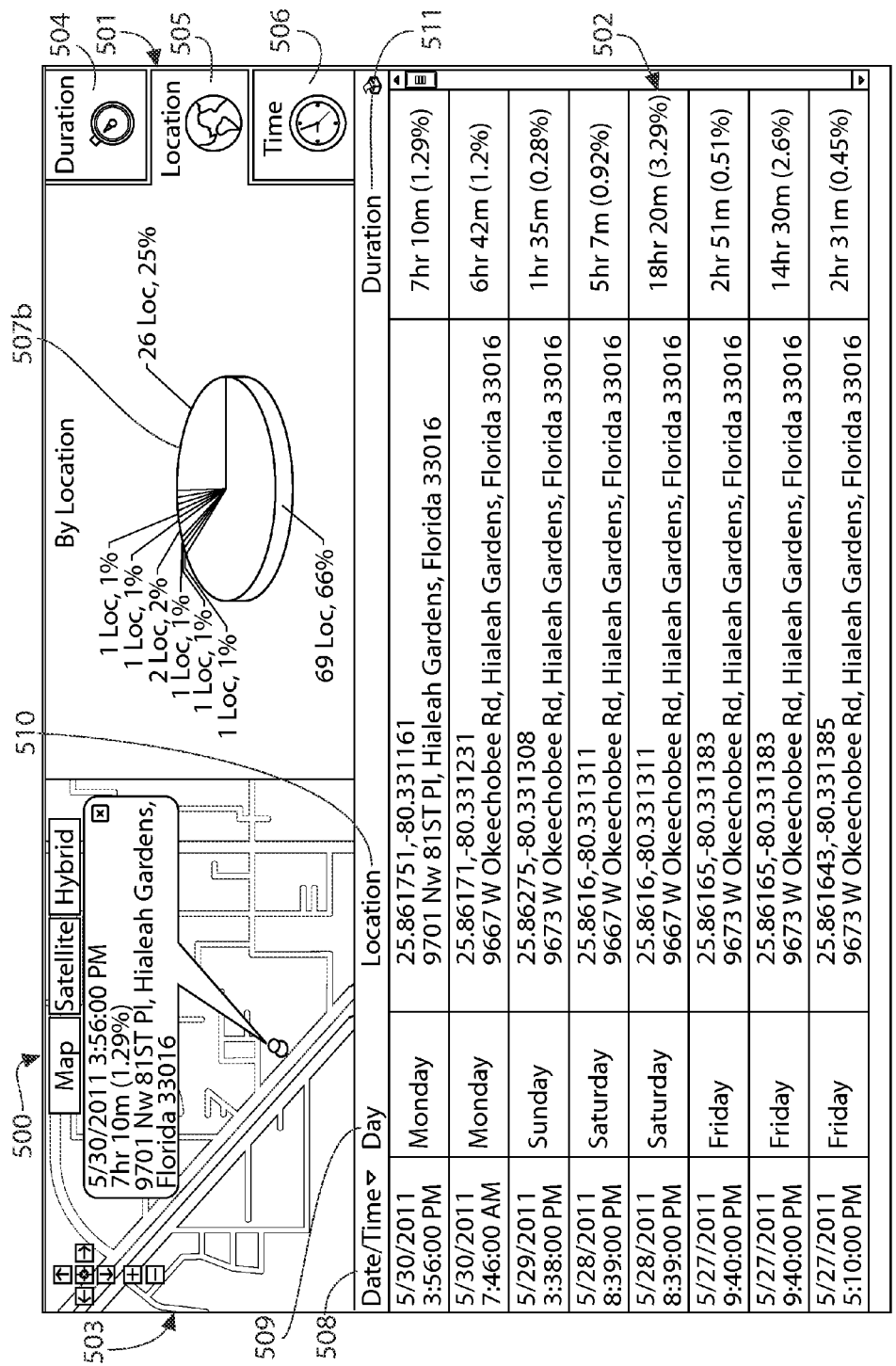
FIG. 5B is a representation of the graphical user interface of FIG. 5A organizing parking trends by location.
Figure 5C:
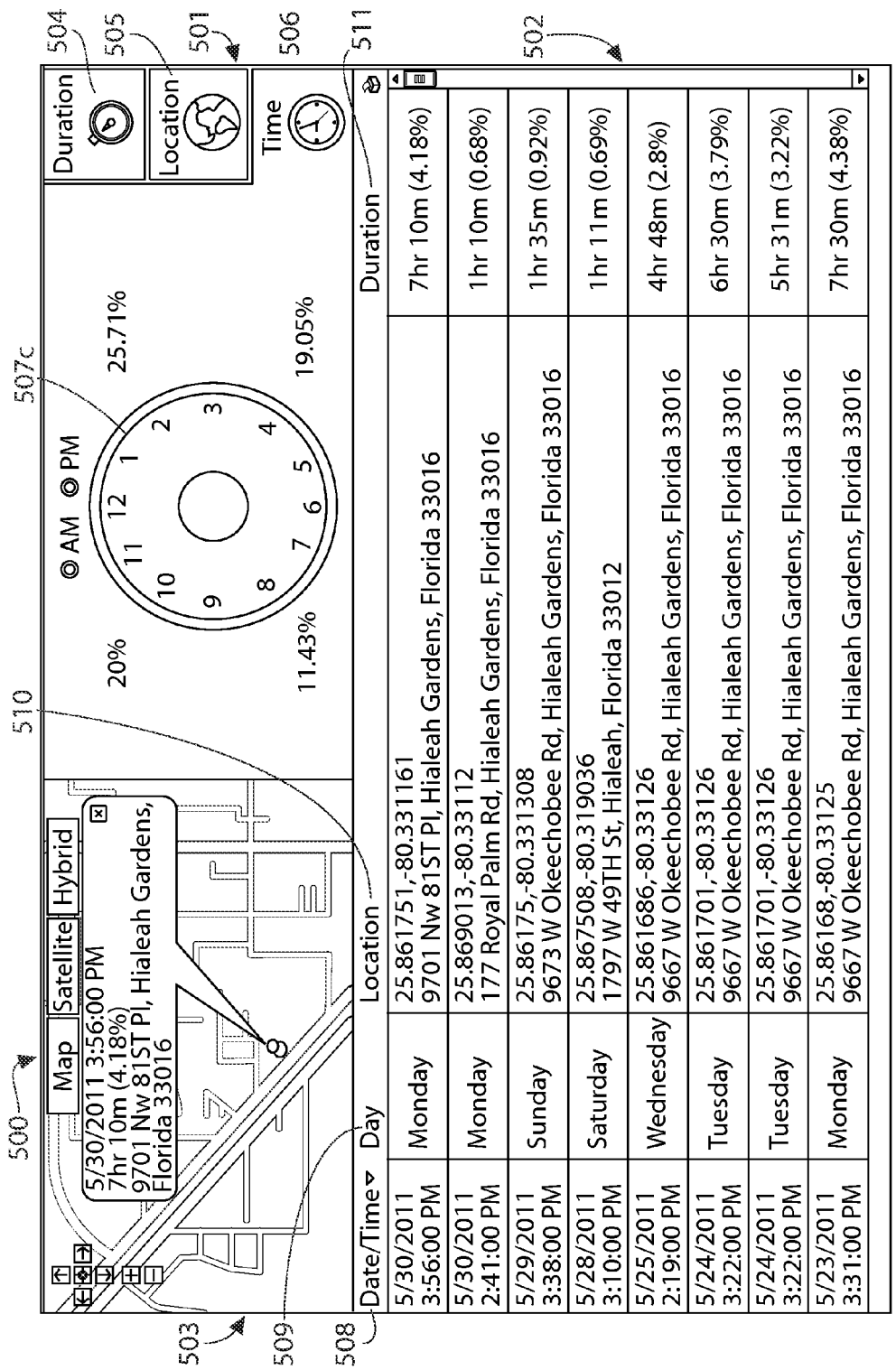
FIG. 5C is a representation of the graphical user interface of FIG. 5A organizing parking trends by time.

After the report 300 is received by the server 140, the server 140 processes the parking information data and configures it for use by an end user in the database 160. Thus, the server 140 breaks down the parking information data and then store it within the database 160 in a manner that can be viewed and manipulated by an end user. Referring to FIGS. 5A-5C, the graphical user interface 500 (hereinafter "GUI") through which an end user will view and manipulate the parking information data will be described in greater detail. FIGS. 5A-5C are screen shots of the GUI 500 and they illustrate the parking information data for a particular vehicle over a particular time frame. Of course, it should be understood that the actual data provided in the GUI 500 will change depending on the parking locations of the vehicle. FIGS. 5A-5C are used only to describe bow the information is presented on the GUI, and not for the particular information illustrated therein.

The GUI 500 presents the parking information data in a clickable pie chart section 501, a data grid 502 and an interactive map 503. The pie chart section 501 of the GUI 500 includes a duration icon 504, as location icon 505, a time icon 506 and a pie chart 507a-c. Clicking on the duration, location or time icons 504, 505, 506 in the pie chart section 501 results in the creation of the pie chart 507a-c with the parking information data organized by duration, location or time. Furthermore, clicking on either the duration, location or time icons 504, 505, 506 will organize the information in the data grid 502 by duration, location or time, respectively.

Referring first to FIG. 5A, the end user has clicked on the duration icon 504 in the pie chart section 501 and the information is organized in the pie chart 507a in terms of duration. Upon clicking on the duration icon 504, the pie chart 507a will appear that informs the end user how many instances the vehicle 101 was parked for 1-2 hours, 2-4 hours, 4-6 hours, 6-10 hours or more than 10 hours, respectively. Furthermore, the data grid 502 will display all of the parking information data details organized by duration with the longest duration of any single parking instance listed first.

The end user can then click on the portion of the pie chart 507a that he/she desires to focus on and view details about. Specifically, the end user can click on the 4-6 hour portion of the pie chart to view detailed information about where and when the vehicle was parked for 4-6 hours or the end user can click on the more than 10 hour portion of the pie chart 507a to view detailed information about where and when the vehicle was parked for more than 10 hours.

Upon clicking on the pie chart 507a, the information will be updated in the data grid 502. Thus, if the user clicks the 6-10 hour block on the pie chart 507a as has been done in the exemplified embodiment, the data grid 502 will present the parking information data only for the instances that the vehicle 101 was parked for 6-10 hours. Specifically, the data grid 502 includes a date and time section 508 that lists the date and time of day that the vehicle entered into the parked state for as particular parking occurrence, as day of the week section 509 that lists the day of the week that the vehicle entered into the parked state on that particular parking occurrence, a location section 510 that lists the location where the vehicle 101 was parked on that particular parking occurrence, and a duration section 511 that lists the duration that the vehicle was parked on that particular parking occurrence. The location section 510 presents the locations where the vehicle 101 was parked as both a longitude latitude coordinate and a specific street address. Once the 6-10 hours block has been clicked on the pie chart 507a, the end user can then click the date/time, day, location or duration section 508-511 tabs to further organize the parking information data according to those parameters. Thus, if the user clicks the date/time tab as has been done in the exemplified embodiment, the parking information data for all parking instances that had a duration of 6-10 hours will be presented in date/time order (either from most recent date to least recent date or vice versa).

The data grid 502 also includes an arrow 514 that indicates how the parking information data is organized. In the exemplified embodiment, the arrow 514 is a downwardly pointing arrow in the date/time section 508. Thus, in the exemplified embodiment, the parking information data is organized by date/time from the most recent date/time to the least recent date/time and then by duration with only parking information data for those instances that the duration was between 6-10 hours listed. If the date/time tab is clicked again, the arrow 514 will point upwards and will list the information from the least recent date/time to the most recent date/time for those instances that the duration was between 6-10 hours.

Furthermore, the end user can click on a particular entry on the data grid 502, which will update the interactive map 503. Thus, if the end user clicks on the first entry 513 in the data grid 502 as has been done in the exemplified embodiment, the interactive map 503 will show the location that was clicked on in a visual and interactive map. The user can view the interactive map 503 in a satellite mode or a normal map mode. Furthermore, the user can scroll north, south, east and west on the interactive map 503 and the end user can zoom in and out on the interactive map 503 to further analyze the area surrounding the particular location associated with the first entry 513 in the data grid 502. The user can click on any of the entries in the data grid 502 to pull up that location on the interactive map 503.

Referring now to FIG. 5B, the parking information data is organized on the GU 500 by location. Thus, in FIG. 5B the end user has clicked on the location icon 505 in the pie chart section 501 of the GUI 500. Upon clicking the location icon 505, the pie chart 507*b* is updated to group the parking information data by location. The parking information data is grouped as a single parking location by the most common locations that exist within as specific radius of one another, not by a specific street address or longitude/latitude coordinate. In the exemplified embodiment, the parking information data is grouped together as a single parking location if it is within a radius of approximately 200 to 400 feet, more specifically within as radius of 250 to 350 feet, and more specifically within a radius of 300 feet. Of course, the invention is not to be so limited and the range within which the parking information data is grouped together as a single parking location can be more or less than that specified above in certain embodiments. Furthermore, this range can be configurable in the same manner that the predetermined minimum time parameter is changed and configured as described above. It is desirable to maintain a small range so that the end user can quickly determine where the device 100, and hence also the vehicle 101, is located with a high level of confidence.

Upon clicking on the location icon 505 in the pie chart section 501, the information is displayed in the data grid 502 organized by location. Thus, the locations that are within a specified radius of one another will be grouped together and listed in the data grid 502. Grouping the parking information data in this way enables the end user to determine relative locations that the vehicle 101 is frequently parked at. For example, the vehicle owner/purchaser may live in an apartment and may park at various locations around or near the apartment complex. By grouping the locations that are within a specified radius of one another, all of the parking locations that are around or near the apartment complex will be grouped together so that the end user can determine the dates and times that the vehicle 101 is parked around or near the apartment complex.

Upon clicking on the location icon 505, the parking information data will be grouped by location as described above. Then, the end user can click on the date/time, day, location or duration tabs in order to further organize the parking information data in the data grid 502 as described above with reference to FIG. 5A. In the exemplified embodiment, the information is grouped by location and displayed in the data grid 502 by date and time. Of course, the user could click on the duration tab and organize the parking information data by location and then by duration rather than date and time.

Finally, referring to FIG. 5C, the parking information data is presented in the GUI in terms of time. Thus, in FIG. 5C the end user has clicked on the time icon 506 in the pie chart section 501 of the GUI 500. Upon clicking the time icon 506, the pie chart 507*c* illustrates a clock and indicates what percentage of the parking information data occurred during a particular time frame. In the exemplified embodiment, the clock is divided into quadrants and a percentage is given for the percent of time that the vehicle 101 was parked between noon and 3 PM, the percent of time that the vehicle was parked between 3 PM and 6 PM, the percent of time that the vehicle was parked between 6 PM and 9 PM, and the percent of time that the vehicle was parked between 9 PM and midnight. The clock can also be changed from PM to AM so that the same information can be provided for the midnight to noon time frame.

The end user can click on the quadrant of the clock that he/she desires to focus in on for a particular time of day and to display the parking information data in the data grid 502 for that particular time frame only. Thus, in the exemplified embodiment the end user has clicked on the noon to 3 PM time frame, and the data grid 502 has been updated accordingly. The data grid 502 illustrates the parking information data for all parking instances that occurred between noon and 3 PM. In the exemplified embodiment, the parking information data is further organized by date/time, but can alternatively be organized by duration, location or day as has been described above. Grouping the parking information data by time presents the information by grouping the parking locations based on the time of day that the vehicle 101 first transitioned from a non-parked state to a parked state. This allows the end user to quickly gather the valid locations that the vehicle 101 is likely to be parked for a specific time of day. The end user can use this information to repossess the vehicle 101 at the most likely locations it will be found during a particular time of day. Repossession agents typically charge a higher premium for repossessing a vehicle at night. Enabling the end user to determine the most appropriate time and location to repossess the vehicle 101 during the day time hours dramatically reduces the costs of repossession.

In certain embodiments, the device 100 can be used as a method of preventing fraud by a purchaser of as vehicle. When an individual desires to purchase a vehicle and can not afford to pay for the vehicle in cash, the individual can finance the purchase with a loan from a financial or lending institution. If the financial or lending, institution has any reason to believe that the individual is providing fraudulent information in order to avoid later repossession of the vehicle upon a default in repayment of the loan, the financial or lending institution can have the device 100 described above installed in the vehicle. Furthermore, when the device 100 is used for fraud prevention, the financial or lending institution must request and record the individual's home and work addresses. The financial or lending institution can then use the parking information data that is stored in the device 100 to determine whether the home and work addresses provided by the purchaser are accurate.

in some embodiments, the home and work addresses of the purchaser can be programmed directly into the device 100 so that the device 100 can compare the home and work addresses of the purchaser with locations that the purchaser parks the vehicle. However, in other embodiments the financial or lending institution can simply view the report 300 on the GUI 500 as described above and compare the parking locations that are transmitted from the device 100 to the server 140 with the addresses provided by the individual who purchased the vehicle.

Thus, the device 100 can operate as described above to track locations that the vehicle is parked or in a parked state for durations that exceed a specific predetermined minimum time threshold, such as two hours. The device 100 can be configured with the necessary algorithms to enable the device 100 to then compare the locations that the vehicle is in a parked state for durations that exceed the specific predetermined minimum time threshold with the home and work addresses provided by the individual who purchased the vehicle.

It is highly probable that as vehicle purchaser will drive the vehicle to his/her home or place of work within a short time frame after purchasing the vehicle, especially if the purchase is not being made fraudulently. Thus, if after a specified period of time, such as one day or one week or any other time period as desired, the vehicle within which the device 100 is installed has not been in a parked state for a duration that exceeds the specified predetermined minimum time threshold at a location that matches one of the addresses provided by the individual who purchased the vehicle, the device 100 can alert the financial or lending institution that the purchase may have been made fraudulently. In this manner, the financial or lending institution will be able to quickly determine a potential fraudulent purchase and can then make attempts to repossess the vehicle in a quick and efficient manner.

In alternative embodiments where the device does not internally compare the vehicle parked state locations with the purchaser's pre-provided addresses, the device 100 will periodically transmit the parking location information to the server 140, which is then stored in the database 160 for end user viewing and manipulation as described above. Thus, the financial or lending institution can log on to the database 160 as has been described above and compare the parking or parked state locations with the pre-provided addresses. If no match between the pre-provided addresses and the parked state locations can be found after a specified period of time, the financial or lending institution can make attempts at repossessing the vehicle.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of tracking parking behavior of a vehicle comprising:
    a) detecting whether the vehicle has entered into a parked state;
    b) upon detecting that the vehicle has entered into the parked state, measuring a duration that the vehicle remains in the parked state;
    c) monitoring whether the vehicle transitions from the parked state to a non-parked state;
    d) comparing the duration that the vehicle is in the parked state to a predetermined minimum time threshold; and
    e) upon the duration exceeding the predetermined minimum time threshold, storing parking information data as a parking instance in a local memory located within the vehicle, or upon the vehicle transitioning from the parked state to the non-parked state and the duration failing, to exceed the predetermined minimum time threshold, discarding the parking information data.

2. The method of claim 1 further comprising, continuing to measure the duration that the vehicle remains in the parked state mail the vehicle is detected in the non-parked state.

3. The method of claim 1 wherein the parking information data comprises a date and time that the vehicle entered into the parked state, the duration that the vehicle was in the parked state and a geographic location of the vehicle when the vehicle entered into the parked state.

4. The method of claim 3 wherein the duration that the vehicle was in the parked state is a total time from the vehicle initially entering into the parked state to the vehicle transitioning to the non-parked state.

5. The method of claim 1 wherein upon detecting that the vehicle has transitioned from the parked state to the non-parked state, returning to step a).

6. The method of claim 1 further comprising storing the parking information data as the parking instance in the local memory for each occurrence that the duration that the vehicle is in the parked state exceeds the predetermined minimum time threshold.

7. The method of claim 6 further comprising generating a virtual log of the parking information data for each of the parking instances in the local memory and organizing the virtual log by longest duration that the vehicle is in the parked state to shortest duration that the vehicle is in the parked state.

8. The method of claim 7 further comprising transmitting the virtual log of the parking information data to a server as a report at a predetermined time interval, the server processing the parking information data and storing the parking information data in a database for end user access.

9. The method of claim 8 wherein the predetermined time interval can be set in increments of one hour.

10. The method of claim 8 wherein when a number of the parking instances stored in the local memory is greater than a predetermined report size, the parking instance containing the shortest duration is deleted from the local memory.

11. A method of tracking parking behavior of a vehicle comprising:
    a) detecting whether the vehicle has entered into a parked state, the parked state being a parking event;
    b) upon detecting that the vehicle has entered into the parked stale, starting a timer to measure a duration that the vehicle remains in the parked state without transitioning into a non-parked state;
    c) comparing the duration that the vehicle is in the parked state to predetermined minimum time threshold; and
    d) upon the duration exceeding the predetermined minimum time threshold, storing parking information data of the parking event as a parking instance in a local memory located within the vehicle.

12. The method of claim 11 further comprising:
    e) upon the vehicle transitioning from the parked state to the non-parked state before the duration exceeds the predetermined minimum time threshold, discarding the parking information data of the parking event.

13. The method of claim 11 wherein the parking information data comprises a date and time that the vehicle entered into the parked state, the duration that the vehicle was in the parked state and a geographic location of the vehicle when the vehicle entered into the parked state.

14. The method of claim 11 further comprising storing the parking information data as the parking instance in the local memory for each occurrence that the duration that the vehicle is in the parked state exceeds the predetermined minimum time threshold.

15. The method of claim 14 further comprising, generating a virtual log of the parking information data for each of the parking instances in the local memory and organizing the virtual log by longest duration that the vehicle is in the parked state to shortest duration that the vehicle is in the parked state.

16. The method of claim 11 further comprising stopping the timer and returning to step a) when the vehicle transitions from the parked state to the non-parked state.

17. A method of tracking parking behavior of a vehicle comprising:
   a) detecting whether the vehicle has entered into a parked state, the parked state being, a parking, event;
   b) upon detecting that the vehicle has entered into the parked state, measuring a duration that the vehicle remains in the parked state;
   c) comparing the duration that the vehicle is in the parked state to a predetermined minimum time threshold; and
   d) upon the duration exceeding the predetermined minimum time threshold, storing parking information data of the parking event as a parking instance in a local memory located within the vehicle,
   wherein the parking information data comprises a date and time that the vehicle entered into the parked state, the duration that the vehicle was in the parked state and a geographic location of the vehicle when the vehicle entered into the parked state.

* * * * *